March 11, 1958 D. C. BEATTY 2,826,636
SOUND AMPLIFYING APPARATUS FOR TELEPHONE AND LIKE CIRCUITS
Filed Jan. 27, 1956
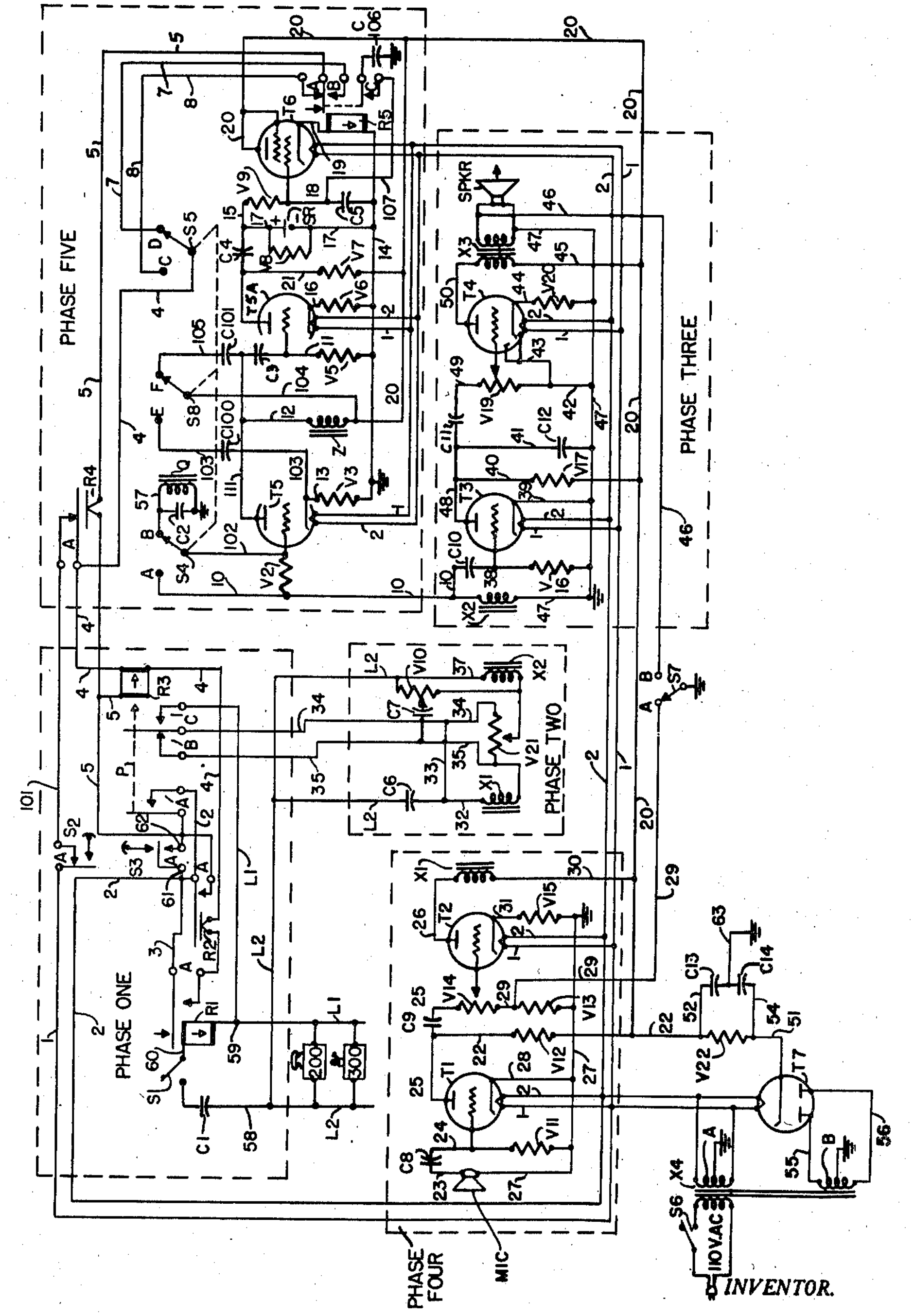
INVENTOR.
DONALD C. BEATTY
BY Frederick A. Zoda
ATTORNEY United States Patent Office 2,826,636

Patented Mar. 11, 1958

2,826,636

SOUND AMPLIFYING APPARATUS FOR TELEPHONE AND LIKE CIRCUITS

Donald C. Beatty, Birmingham, Ala.

Application January 27, 1956, Serial No. 561,796

15 Claims. (Cl. 179—1)

This application bears relationship to U. S. Patents Numbers 2,525,763 and 2,539,565 previously granted to me on October 17, 1950, and January 12, 1951, respectively, and is a continuation-in-part to my co-pending applications, Serial No. 193,988 and Serial No. 409,033, filed November 3, 1950, and February 9, 1954, respectively.

The present invention relates to an improved and novel electrical apparatus for amplifying the voice or other sound made by a party calling a telephone circuit to which the apparatus is connected, and for transmitting to the calling party the voice or other sound made by any party, parties or things within the acoustical range of the device.

More specifically, the invention relates to apparatus such that the user can cause it to automatically function without his further action or attention, or alternatively cause it to remain inoperative until he elects to cause it to function.

An important object is to provide means to enable one to call the telephone circuit to which the apparatus is connected, and thereafter, so long as he may desire, listen to any sound originating within the acoustical range of the apparatus without disclosure of such listening to persons or things located in the vicinity of the apparatus. Thus, a person having the apparatus connected to a telephone circuit at his place of business or elsewhere may telephone said location from any other telephone. Then, when the telephone connection is established, he may listen to any and all sounds originating within the acoustical range of the apparatus. At his option, the callee may thereafter hang up, and cause the connection to be severed. The apparatus will then turn itself "off" and will return to a standby condition awaiting the next telephone call. It is proposed to accomplish this without the knowledge of a person, persons or things located in the vicinity of the apparatus.

The desirability of apparatus of the character mentioned will be readily appreciated as being in the interest not only of the general public in conducting its personal affairs, but also fills a long felt need of individuals of the many professions, business firms, organizations and departments of city, state and federal governments. This is so because in the normal use of a telephone, the user must go to that instrument and remain in its immediate vicinity while utilizing one of his hands to hold the ear piece and microphone of the instrument. This makes it difficult if not impossible for the user at the same time to use his hands and head in a normal manner while for example, copying the transmitted intelligence, making memoranda, searching through notes, files or papers for data or performing activities away from the immediate vicinity of the telephone. Further, it is frequently desired to ascertain the degree of safekeeping of things of value at a place of business during periods of the owner's absence.

It is, accordingly, an important object to provide apparatus which will be capable of eliminating the current difficulties above described.

Other important objects are to provide apparatus as stated that will be simple and compact; will be attachable to a conveniently and conventionally installed telephone instrument or to the connecting wires thereof; will be capable of installation with a minimum expenditure of time and effort; will offer no problems in the use thereof by the parties; will be economical in construction; and by election of the user, will be automatically either placed in operation or held inoperative until manually caused to function.

In simple terms the invention, automatically or by manual control of the operator, operates over a telephone circuit similarly to the manner by which a conventional intercommunication set operates to and between nearby offices. The apparatus permits full two-way conversations without the inconvenience of manual or other circuit switching to permit either "listen" or talk" functions of the device; when connected to a telephone circuit and adjusted to the automatic position and with proper electric power connected to the apparatus, the electrical ringing surges of an incoming telephone call start the apparatus. Without the callee touching a nearby telephone connected to the circuit, or in any manner lifting the telephone receiver, the voice of the calling party is amplified and emitted from the loudspeaker of the device with any selected volume of sound; and, a person or persons within acoustical range of the device may without further ado converse freely in a normal manner with said calling party. The calling party, by hanging up his receiver causes the apparatus to return to a normal standby or off condition. Also, the callee of the device may, at his election during normal use of the telephone, cause the apparatus to begin functioning after which he may hang up and continue the conversation by means of the apparatus with the apparatus again, following such use, returning automatically or otherwise to the normal standby or off condition.

Further, by means of a single switch, the user may go to another telephone connected to a different circuit and, upon establishing a connection with the circuit to which the apparatus is connected, may thereafter hear any sounds within the acoustical range of the appaartus. When the receiver over which the caller has been listening is hung up, thus severing the closed circuit connection between the two respective telephone loop circuits, the apparatus is caused to return to the off or standby condition awaiting the next telephone call thereto, for a repetition of the function described.

Other objects will appear from the following description, the claims appended thereto, and from the annexed drawings, in which like reference characters designate like parts throughout the several views, and wherein:

The single figure is a schematic view of the electrical circuit employed in the invention.

The main power supply and filter circuits, including tube T7, condensers C13 and C14, resistor V22, transformer X4, switch S6, the associated and connecting leads, including the connection of the leads 110 v. A. C. to a source of appropriate power, are known per se in the art, and are not claimed herein as new, except perhaps in combination with the circuit arrangements constituting the invention. However, the power supply and filter circuit is appropriately connected to a source of electric power, and provides current in the required quantity and kind to permit operation of the invention as herein disclosed.

The description of the apparatus which follows, will be divided into five general sections or phases. Each such phase pertains to a particular function performed by the apparatus, namely:

Phase One: The manual or automatic control circuit;

Phase Two: The segregating or balancing network circuit;

Phase Three: The vacuum tube "receiving" circuit;

Phase Four: The vacuum tube "transmitting" circuit;

Phase Five: The automatic "turn-off" circuit.

PHASE ONE

L1 and L2 are leads connected directly to an ordinary telephone circuit to which an ordinary telephone 200 and its signal device 300 are likewise connected.

Extending respectively from the leads L1 and L2 are leads 59 and 58, connected to the coil winding of relay R1, lead 58 having in series connection therewith condenser C1 and manually operable switch S1. Switch S1 is left open for manual operation of the device and is placed in closed position for automatic operation.

Through the ordinary telephone circuit, there is adapted to pass a "sustaining" direct current during ordinary conversation between a calling and a called party.

On other occasions, an "intermittent" current is caused, automatically or otherwise, to pass through the telephone circuit to cause actuation of a signal device such as a bell. This is exemplified by sending alternating current surges at intervals through the circuit to the bell or other signal device.

With switch S1 closed, the "intermittent" alternating current flowing through leads L1 and L2 will not only actuate the device 300 but will also flow through the coil winding of and energize relay R1. This will result in the closure of normally open switch contacts A of relay R1, and so will close a circuit including lead 1, the low voltage secondary coil winding of power transformer X4, lead 2, lead 3, the closed contacts A of relay R1, lead 4 which has in series therewith the thermo-element of a thermo-controlled relay R2, the normally closed contacts A of relay R4, lead 101, the normally closed contacts A of switch S2, and back to lead 1 to complete and close the circuit.

With manually operable switch S6 closed and the primary winding of power transformer X4 connected to a source of electricity relay R1 will cause the thermo-element of relay R2 to perform its function of heating to a degree required to cause said relay to be actuated. The relay R2 is of a type well known in the art and operates after a selected delay. Said delayed action may be selected to occur after any desired period of time following the completion of an electric circuit carrying current to and through its thermo-element.

The purpose of using a delayed action relay R2, as distinguished from a conventional, instantly acting relay, is to permit the telephone signal to persist for a predetermined period of time, thus to transmit intelligence to the callee that a caller will shortly cause the invention to become operative, and that thereafter the caller will be able to hear any word or other sound made by the callee as long as the invention is permitted to operate. Thus, the callee is given an opportunity to stop any conversation before the microphone begins to pick up what might be private or confidential information.

After the selected period of time has elapsed, the thermo-element performs its function and causes the normally open contacts A of relay R2 to close. A closed circuit is thus completed to and through the field winding of holding relay R3 causing that relay to be activated as follows: lead 1, the low voltage secondary coil winding of power transformer X4, lead 2, closed contacts A of relay R2, lead 5 to one terminal of the coil winding of relay R3, the other terminal of that winding, lead 4, normally closed contacts A of relay R4, lead 101, normally closed contacts A of manually operable switch S2, and return to lead 1 to thus close the circuit.

With the completion of the closed circuit to and including the field winding of relay R3, that relay is activated, and causes the movement of element P which is electrically insulated from the associated relay contacts A, B, and C. The action of P in turn causes the said contacts to reverse their respective electrical status, that is, contacts A close, contacts B open, and contacts C close. The closing of contacts A, among other things, places a short circuit across the switch contacts A of relay R2. Therefore, there will be closed a circuit, not by means of the closed switch contacts of relay R2, but by and including the closed switch contacts A of relay R3, lead 5, coil winding of relay R3, lead 4, normally closed contacts A of relay R4, lead 101, normally closed contacts A of switch S2, lead 1, low voltage secondary winding of transformer X4, lead 2 and return to closed contacts A of relay R3 to close the circuit. The result will be to hold relay R3 energized, without possibility of its being affected by any intermittent opening and closing of switch contacts A of relay R2 under the action of the intermittent current or of the thermo-element referred to. The de-activation of relay R3 and its return to its normal inoperative condition is described under the heading Phase Five.

With the activation of relay R3, the opening of its contacts B and the closing of its contacts C, an electrical load in the form of a shunt connection is placed across telephone circuit connecting leads L1 and L2 as follows: lead L1 to one side of a telephone circuit, not shown, the other side of the telephone circuit, lead L2, one terminal of primary winding of coupling transformer X2 and to one terminal of resistor V10 connected in parallel therewith, lead 37 and the other terminal of primary winding of transformer X2 jointly connected to the adjustable center connection of resistor V21, one end terminal of resistor V21, lead 34, closed contacts C of relay R3 and return to lead L1 to complete and close the circuit.

The closing of this circuit brings about the operation of devices, not shown, that result in the cessation of the "intermittent" alternating current referred to in the telephone circuit. The actuation of these devices likewise results in the establishment and stabilization of the "sustaining" current in said telephone circuit, and in the leads L1 and L2. The stabilized conditions will persist so long as resistance V10, V21 and the primary winding of transformer X2 remain in shunt across said circuit, or until said circuit is interrupted either automatically or manually, such as by severance or by an interruption in the closed circuit to and including relay R3.

It has been previously described how the circuit to and including the relay R3 and the normally open contacts A of thermo-controlled relay R2 are closed by the energization of relay R1 followed thereafter by the energization of relay R2. With the establishment of the "sustaining" direct current in leads L1 and L2 coincident with the above described shunt connection being placed across leads L1 and L2, and with the resultant cessation of the "intermittent" alternating current, the normally closed contacts A of thermo-controlled relay R4 will continue to remain in the closed position. Energization of the thermo-controlled relay R4 is hereinafter described in section Phase Five.

It will thus be seen that with switch S6 closed, a call placed to telephone 200 will, on the first surge of the "intermittent" current, energize the relay R1 to momentarily close its normally open switch contacts; that the momentary closing of said contacts closes an electrical circuit including the thermo-element of thermo-controlled relay R2; that, following a predetermined period of time the relay R2 is caused to operate and so close its normally open switch contacts A; that the closing of contacts A completes a closed circuit including the coil winding of relay R3 and thus causes said relay R3 to become activated; that the activation of relay R3 closes its switch contacts A and C and opens its contacts B; that the closure of the said contacts A of relay R3, among other things, closes a circuit to and including the coil winding of relay R3, the result of which will be to hold relay R3 energized, without possibility of its being affected until and unless the closed circuit in which it is included shall become open and incomplete; that the closing of contacts C of relay R3 causes the aforementioned shunt connection to become electrically established across and between leads L1 and L2, thus to complete and close a circuit including a telephone circuit to which leads L1 and L2 are connected. It will also be seen that immediately upon the above things taking place, the "intermittent" current is caused to cease and to be replaced with the stabilized conditions of the "sustaining" current. Intelligence or other sound may thereafter, until interrupted as hereinafter described, be exchanged between a person or persons within the acoustical range of the invention and a person within the acoustical range of an ordinary telephone connected to a telephone circuit, not shown, with which the invention described is electrically associated.

In addition to the foregoing, means are provided to permit the operator of the device to manually cause its operation, as for example, when desiring to use the device following establishment of a connection between caller and callee by means of ordinary telephone instruments in the normal manner. Further means are provided to permit the operator to manually cause it to cease operation and to return to an inoperative or standby condition. These means are now disclosed by the following.

It has been previously described how the closing of switch contacts A of relay R2 close and complete a circuit to and including the coil winding of relay R3, in combination, and how the operation of relay R3 causes designed events and things to occur. By reference now to the drawing and more particularly to Phase One thereof, it is observed that the contacts of the manually operable switch S3 may be placed in short circuit or shunt connection across the switch contacts A of relay R2 by the leads 61 and 62. The circuit completed to and including the relay R3 is not now closed by the closure of switch contacts A of relay R2 as previously described, but by the manual closing of contacts A of manually operable switch S3 being placed in shunt or short circuit connection across the said contacts A of relay R2. The invention, by the described operation of switch S3, will therefore become immediately activated and begin to function as arranged because the relay R3 will have become energized and operative as heretofore described.

As set forth above, the circuit closed to and including the coil winding of relay R3 includes the normally closed switch contacts A of manually operable switch S2. Therefore, by manually opening those normally closed contacts the circuit closed to and including the contacts A and the coil winding of relay R3 will become severed and open. The opening of the circuit to and including the coil winding of relay R3 deenergizes said coil winding and causes the contacts A, B, and C thereof to return to their normal positions. The normal position of the contacts A is the open position. Since these contacts function as "holding" contacts for the relay R3, their return to an open position severs the closed circuit thereto irrespective of the immediate closing thereafter of the contacts A of switch S2. The relay R3 is thus maintained deenergized and inoperative until a subsequent reactivation of the invention.

PHASE TWO

*Segregating or balancing network*

This phase consists of a novel segregating or balancing network consisting of electrical components disposed in closed, series, and shunt connection paths with and including leads L1 and L2 and the telephone circuit. By novel and appropriate arrangement of these components, the balancing is obtained in the circuits comprising the Phase Two, Phase Three, Phase Four and Phase Five portions of the invention and the telephone circuit to which it is connected. The attenuation and electrical balancing of the several circuits so obtained permits the joint, approximately simultaneous connection to a common pair of leads L2 and 34 of a vacuum tube "transmitting" amplifier (Phase Four), a vacuum tube "receiving" amplifier (Phase Three) and an automatic "turn-off" circuit (Phase Five) in complement to each other and without impairment of operation of the several electrical circuits comprising the invention. This is accomplished without introducing undesirable electrical changes or irregularities within the apparatus or within the telephone circuit.

The electrical components making up the Phase Two portion consists of condensers C6 and C7, variable resistors V10 and V21, secondary winding of transformer X1, primary winding of transformer X2, and the associated leads L2, 33, 32, 36, 35, 34, and 37.

Connected in circuit as hereinafter described, current carrying sound waves flowing from the Phase Four circuits, as shown, are "zeroed out," cancelled and ineffective with respect to the secondary winding of transformer X2 of the vacuum tube "receiving" amplifier hereinafter described as the Phase Three portion of this invention.

The said current carrying sound waves, developed by the illustrated circuits shown as Phase Four, are inductively impressed in or upon the secondary winding of transformer X1 from the primary winding thereof, and thence to leads 32 and 36. The closed circuit involved thereby may be traced as follows: lead 36, one terminal of resistor V21, lead 35, condenser C7, adjustable center connection of resistor V10 and through a portion of that resistor to one of its terminal connections, lead L2 connected to one side of a telephone circuit, not shown, the other side of that telephone circuit, lead L1, closed switch contacts C of relay R3, lead 34, lead 33, lead 32, to the other terminal connection of the secondary winding of transformer X1 to thus complete and close the circuit. The electrical paths above described constitute those paths of a required harmonious relationship and electrical balance to and with the connecting telephone circuit, not shown, and are paths of least electrical resistance and delay to the current or voltage generated and emitted by the Phase Four circuits. Such paths thus offer the preferable means of conduction to those voltages.

It may be observed at this time, that with respect to alternating current circuits over which sound, in one wave form or another may be conducted, the use of condensers therein or therewith does not offer resistance to the conduction or passage of such wave forms.

With respect to the foregoing and by examination of the Phase Two circuits, it will be observed that a direct electrical connection exists between the secondary winding of transformer X1 via leads 32, 33, 34, the closed contacts C of relay R3, and thence via lead L1 to one side of the telephone circuit, not shown, to which the lead L1 is connected. It will further be observed that an electrical circuit likewise exists from the other terminal of the secondary winding of transformer X1 to the other side of that telephone circuit, viz: lead 36, one terminal of resistor V21, lead 35, condenser C7, center pole adjustable connector of resistor V10 and through a portion of that resistor to its terminal connected with lead L2, and thence to the other side of the said telephone circuit to close and make complete that circuit. This nullifies and makes ineffective upon primary winding of transformer X2, any detrimental portion of the voltage generated or emitted by Phase Four circuits. It is pointed out that the resistor V10 is in shunt or short circuit connection across the terminal connections of the primary winding of transformer X2, and this, together with the circuits and components above described, prevents the induction or passage into transformer X2 and therefrom into the Phase Three "receiving" circuits of any voltages generated or emitted by those illustrated as Phase Four circuits. Because of these facts, the voltages generated by the Phase Four circuits as hereinafter described, are ineffective with and upon the transformer X2 and other components of the Phase Three circuits.

The function and operation of the Phase Two circuits, with respect to current carrying sound waves incoming over leads L1 and L2, in circuit, and with the respective telephone circuit, not shown, to which said leads are connected, may be traced on the drawing as follows: one side of a telephone circuit including instrument 200 to which lead L1 is connected, closed switch contacts C of relay R3, lead 34, one terminal of resistor V21, through a portion of resistor V21 to its adjustable center terminal, lead 37 to one terminal of primary winding of transformer X2, the other terminal of primary winding of transformer X2, lead L2, to the other side of the telephone circuit referred to. The condenser C6, in shunt connection between lead L1 and lead L2 by means of lead 32, lead 33, lead 34 and closed contacts C of relay R3, is so connected to add its designed electrical storage and capacitive characteristics to this balancing and segregating network and to thus aid in the filtering or balancing out of undesirable sound wave forms which might otherwise be effective upon transformer X2 and other elements comprising the Phase Three circuits. The electrical paths described are those paths of harmonious electrical relationship and balance and offer the least electrical resistance and delay to the voltage carrying sound waves incoming from the telephone circuit to which leads L1 and L2 are connected, and thus offer the preferable means of conduction for or to those currents.

The peculiarities of sensitive bridge or balancing network circuits require the maintenance of determined electrical values and characteristics of the components and connecting leads thereof. When there is an alteration of such values, the circuit combination becomes unbalanced and ineffective. Now, in the case of the Phase Two circuits described in the foregoing, determined electrical values and characteristics of components are maintained during the period of time the invention bears electrical relationship or connection with the telephone circuit. At such other times, as for example when the apparatus is in the standby or inoperative condition awaiting a subsequent activation, this electrical balance is not present because during such periods the electrical values and characteristics additive by the said telephone circuit, have been removed from the balancing network of the Phase Two circuits by action of the relay R3. To overcome and prevent the results of such an unbalanced condition awaiting a subsequent activation, I have provided means as described below, to prevent such events taking place.

It will be observed that the normally closed contacts B of relay R3 are in shunt or short circuit connection across the secondary coil winding of transformer X1 whenever the relay R3 is inoperative as, for example, when the invention is in the standby or inoperative condition awaiting a subsequent activation. This shunt or short circuit across secondary winding of transformer X1 may be traced as follows: one terminal of secondary winding of transformer X1, lead 36, lead 35, closed contacts B of relay R3, lead 34, lead 33, lead 32, and return to the other terminal of the said secondary winding to close and complete the circuit. The short circuiting of secondary winding of transformer X1 as described, nullifies and cancels out any current which might have been induced in or upon the Phase Three circuits from the primary winding of the transformer X1. It therefore follows that with such current nullified and cancelled out as described, there cannot be, nor is there any induction therefrom into or upon the Phase Three circuits, in combination, described hereinafter. Therefore, with the instant invention in the standby or inoperative condition, undesirable sound waves from the Phase Four circuits, in combination to be described, cannot be induced in or upon the Phase Three circuits or emitted by or from the loudspeaker SPKR during periods when the invention is in the standby or inoperative condition awaiting a subsequent activation.

The novel balancing and segregating network above described, is the preferred method of adapting the invention to operate as designed. Other less efficient and effective means may be utilized however for making the apparatus operable to a lesser degree of efficiency. To name one such means, reference is made to the "hybrid" coil or transformer, a device having coil windings and/or other components each of which is electrically balanced properly with respect to the other. Such may be used in lieu of those above described Phase Two circuits. Such use is more fully described in my co-pending application, Serial Number 409,033, filed February 9, 1954.

PHASE THREE

*The vacuum tube receiving circuit*

This vacuum tube voltage amplifier, in circuit combination as illustrated by the drawing, is a novel arrangement of vacuum tubes T3 and T4 and associated inductance, resistors, transformers, capacitors and a loudspeaker. While such a voltage amplifier is not new per se to the art, its use in the combination described, is believed novel.

With reference to the drawing, it will be observed that transformer X4, the primary of which has leads marked 110 v. A. C. extending therefrom, rectifier tube T7, resistor V22, condensers C13 and C14, leads A and B extending from the mid-point of the secondary windings of transformer X4 to the common ground, and leads 51, 54, 52, 22, connected in combination, constitutes in and of itself a power supply and rectifying circuit well known in the art. With consideration thereto, it will be readily apparent that with leads 110 v. A. C. of transformer X4 connected to an appropriate source of electric current, and with the switch S6 in closed position, negative direct current will pass between this power supply and rectifying circuit combination and the Phase One, Phase Two, Phase Three, Phase Four and Phase Five circuits as shown, via the common ground as illustrated, and that positive direct electric current will pass between these named circuits via the connecting lead 22 and others. The operation and detailed functioning of this power supply and rectifying circuit combination is described in more detail in my co-pending application, Serial Number 409,033, above referred to.

Now with reference to the illustrated Phase Three circuits in detail, lead 22, connected to the positive direct current output of the rectifying circuit, carries the high potential positive direct current to the plate element of output tube T4 via lead 20, lead 45, primary winding of transformer X3, and lead 50. Appropriate resistors and capacitors in correct and conventional circuit to the other element of output tube T4 and first amplifier tube T3, will, when current carrying sound impulses are induced in or upon secondary winding of transformer X2 from its primary winding, cause such voltage to be amplified and emitted in a greater or lesser amount from loudspeaker SPKR. The extent of volume of sound so emitted from SPKR is adjustable by the operator of the device by means of the adjustable volume control resistor V19 provided for that purpose, said adjustable means controlling the amount of input current or voltage to the grid element of output tube T4 which, in turn, emits a greater or lesser amount of such voltage impulses to loudspeaker SPKR, in circuit. This results in a greater or lesser sound wave output by said loudspeaker SPKR. The current or voltages induced into the secondary winding of transformer X2 from the primary winding thereof, are so induced, not from the emission of the Phase Four circuits, but from those incoming over leads L1 and L2, in circuit, from the telephone circuit, not shown, to which said leads L1 and L2 are connected. This fact is described heretofore in the section Phase Two description.

PHASE FOUR

*The vacuum tube transmitting circuit*

The vacuum tube voltage generating or amplifying "transmitting" circuit, in circuit combination as illustrated by the drawing, is a novel arrangement of vacuum tubes T1 and T2 and associated inductance, resistors, capacitors, transformer, a source of appropriate electric power and a microphone. While such a voltage generating or amplifying circuit is not new to the art per se and no such claim is made herein to this circuit as a novel subcombination in and of itself, its use in combination with other circuits described is believed novel.

With reference to the drawing and to the Phase Four section in detail, and with switch S6 closed and the primary winding of transformer X4 connected to an appropriate source of electric power, current will be induced into the secondary windings of that transformer. With the two secondary windings of transformer X4 connected as illustrated, proper and appropriate direct current voltage will be supplied, not only to the plate elements of voltage generating or amplifying tubes T1 and T2, but likewise to resistors, capacitors, inductance, transformer and microphone in circuit as illustrated, comprising the Phase Four portion of the drawing.

With further reference to the illustrated Phase Four circuits, lead 22, connected to the positive direct current output of the rectifying circuit, carries the high potential positive direct current to the plate elements of tubes T1 and T2 as follows: lead 22, resistor V12, lead 22, lead 25 to the plate element of tube T1; and, lead 22, lead 20, lead 30 to one terminal of the primary winding of transformer X1, lead 26, to the plate element of tube T2. With the negative high potential voltage appropriately connected in proper and conventional circuit to the illustrated components of the Phase Four circuit by means of the comon ground connection, a complete and closed electric circuit results.

By the means above described and provided, it therefore logically follows that when audible sound waves are impressed upon the diaphragm of microphone MIC, such sound waves will, in the form of increased voltage, be impressed in or upon the grid element of first voltage amplifying tube T1. By the designed function of that tube, such voltage will be increased and again impressed, by appropriate circuits as illustrated, in or upon the grid element of second voltage amplifying tube T2. Again, by the designed function of tube T2, such increased or generated voltage will flow or pass between the plate element of tube T2, lead 26, and, among other things, will flow or pass to and through the primary winding of transformer X1. These impulses will thereupon be induced into or upon the secondary winding of transformer X1 in closed circuit as heretofore described, to and including the telephone circuit, not shown, to which the apparatus is connected by its leads L1 and L2.

Attention is here called to the adjustable resistor V14, illustrated in circuit combination and provided for the purpose of controlling, within limitations, the amount of input voltage impressed in or upon the grid element of tube T2. As a result of such adjustment, tube T2 emits a greater or lesser amount of voltage impulses. Any such adjustment controls to a greater or lesser amount the amplified voltages emitted by tube T2 and subsequently induced into or upon transformer X1, leads L1 and L2, and into or upon the telephone circuit to which said leads, in circuit combination, are connected. Attention is further directed to resistor V13 which is entered in series connection by lead 29 and lead 27 between one terminal of adjustable resistor V14 and the common ground connection to which lead 27 is connected. It will be further observed that to lead 29 which connects one terminal of resistor V14 with one terminal of resistor V13, there is extended the lead 29 to terminal A of switch S7. The switch S7 is of the single-pole double-throw type so adapted that its single center pole connection may be manually placed into electrical connection with either of its two terminal poles, A or B. The switch S7 as illustrated, is shown connected to its terminal A and, as will be observed, with said center pole connection permanently connected to the common ground connection of the apparatus. By manually placing the switch S7 to its A position and thus connecting lead 29 to the common ground connection, a shunt or short circuit connection is placed across the terminals of resistor V13 and renders that resistor ineffective on or upon the Phase Four circuits or components thereof so long as said shunt or short circuit shall persist. The result of this short circuiting causes a reduction in the amount of the grid-to-ground resistance between the grid element of tube T2 and the common ground connection, thus causing a lesser amount of voltage from the plate of the preceding tube T1 to be impressed in or upon the grid element of tube T2. Conversely, the removal of the shunt or short circuit connection from the resistor V13, as for example by placing the center pole connection of switch S7 to its B position, increases the amount of the grid-to-ground resistance between the grid element of tube T2 and the common ground connection, thus causing a greater amount of voltage from the plate of the preceding tube T1 to be impressed in or upon the grid element of tube T2. By the means provided therefore, the switch S7 operates to control to a greater or lesser quantity the amount of voltage emitted by said Phase Four circuits and induced in or upon transformer X1, leads L1 and L2 in circuit combination, and the telephone circuit, not shown, to which said leads are connected. This is so, because by restricting the amount of voltage in circuit, to a greater or lesser extent through the addition or subtraction of circuit resistance by means of adjustable resistor V14 and the resistor V13, the tube T2 by design, is enabled to amplify or increase only the said voltage received by its grid element and to subsequently emit same via its plate element and connecting leads thereto. Such amplification is controlled, by adaptation, in ratio to the amount or quantity of said voltage first having been impressed in or upon its grid element.

One purpose of the switch S7, provided in circuit combination as described, is to provide a manual control for the rapid selection of either of two pre-determined degrees of amplifications or generation of voltages by the Phase Four circuits, with the resulting effect of an increase or decrease of the sensitivity of microphone MIC to sounds originating within or reaching its acoustical range. This is accomplished by the means provided, without in any manner affecting the pre-set or adjusted condition of the adjustable resistor V14 which adjustment may be used for example, during the ordinary use of the apparatus in the transmission of sounds or intelligence between parties. During such ordinary use of the apparatus the switch S7 is placed in its A position thus short circuiting or shunting out the resistor V13 as an effective and active component of the Phase Four circuit.

A further purpose of the switch S7 is to cause the effect of the removal of loudspeaker SPKR from the Phase Three circuits as an effective and active component thereof for the reasons described heretofore. The circuit to accomplish this may be traced on the drawing as follows: the common ground connection to which the center pole of switch S7 is connected, switch S7 placed in its B position, lead 46 to one terminal each of the secondary winding of transformer X3 and the voice coil winding of loudspeaker SPKR, from the other terminal of the secondary winding of transformer X3 and the other terminal of the voice coil winding of loudspeaker SPKR, lead 47 to the common ground connection and to thus close and complete the circuit.

From the preceding description it is obvious therefore that with switch S7 placed in its A position, ordinary and normal use of the apparatus may be accomplished. It is likewise obvious that with switch S7 placed to its B position, the loudspeaker SPKR is short circuited and grounded out and becomes inoperative; and, simultaneously greater amplification and voltage increase is attained by the Phase Four circuits and components, causing in effect an increase in the sensitivity of microphone MIC and a resultant induction of increased voltage into or upon transformer X1 and the Phase Two circuits, and thence via leads L1 and L2 to the telephone circuit, not shown, to which said leads are connected. It is apparent therefore, that with the foregoing conditions established, or either of them, that the apparatus may be caused to function in the manner or manners set forth above.

From the above and other description provided, it is shown that when microphone MIC picks up sound, as for example, when audible sound waves are impressed therein or thereon, such sound waves are converted into voltage carrying sound impulses, that such voltages are amplified and/or generated as they pass or progress in circuit combination through or along the vacuum tube voltage generating or amplifying Phase Four circuits above described and, that by circuit combination, those increased voltages are impressed into or upon the telephone circuit, not shown, to which the apparatus is connected by leads L1 and L2. Also, as previously described, such amplified and/or generated voltages will, with respect to the Phase Three "receiving" amplifier circuits, be "zeroed out," cancelled and ineffective upon said Phase Three circuits.

PHASE FIVE

*The automatic turn-off circuit*

The automatic turn-off circuit consists in circuit combination of a novel arrangement of vacuum tubes and associated connecting leads, condensers, resistors, inductances, selenium rectifier, a thermo-element controlled relay switch and a normal or current controlled relay switch. The purpose of this phase is to provide a means whereby the apparatus, after being placed in operation either by the operator by use of the means provided for such manually controlled operation, or automatically by a different means provided, will, following such operation be caused to automatically return to the inoperative or standby condition awaiting a subsequent activation.

In general, the Phase Five automatic cut-off circuit as hereinafter described, is arranged to respond to and effect an automatic turn-off of the invention following its designed use. Means are provided to effect that objective, said means being activated by either the presence or the absence of current carrying sound wave impulses in the telephone circuit, not shown, to which the invention is connected by its leads L1 and L2, following the severance of the circuit closed to and between the said telephone circuit and the invention, as for example, by the calling party hanging up his telephone receiver, or by other means.

Somewhat as a preamble to the foregoing and to the description which follows, it is pointed out that while telephone systems and circuits currently in use attain the objective of making possible the transmission of sound and other waves, the expedient means used to do so differs somewhat between the various systems and organizations managing or owning such systems and circuits. As one example of this, it will be recalled that when placing against one's ear an ordinary receiver from an ordinary telephone operated or owned by one organization, a distinctive and sustained tone signal is heard from that receiver which may indicate to the listener that the telephone is operable and is ready to be used in the normal manner. Again, when placing against one's ear the receiver from another ordinary telephone operated or owned by another or different organization, the said tone signal may not be audibly present; such signal apparently appearing and becoming audible only after the initial use of the dial for the purpose of calling a desired number. Other telephones, systems or circuits may be so adapted as to cause the audible presence or the absence of such a distinctive and sustained tone signal following the severance of the said circuit established to and between caller and callee, said signal by arrangement, apparently appearing and becoming audible only in the telephone circuit portion including the telephone receiver of the caller, or by another arrangement, it may be audibly present or absent only in that particular portion of said circuit including the telephone receiver of the callee.

The Phase Five automatic turn-off circuit described in detail hereafter, consists of a novel and original means provided to accommodate the different arrangements of telephone circuits referred to in the paragraph first above, viz.: to automatically return the invention to the inoperative or standby condition by means first activated either by the audible presence of a tone signal or sound impulse voltage wave falling or coming within the audible frequency range and sustained in the telephone circuit to which the invention is connected following the interruption or the opening of that telephone circuit, as for example by the caller hanging up the receiver of the telephone then used by him, or, by the absence of such an impulse voltage in said circuit. The turn-off function of the invention, activated by the absence of such an impulse in the telephone circuit, is an improvement over means provided and disclosed as Fig. 3 of U. S. Patent No. 2,539,565, granted me on January 12, 1951.

As described above, a distinctive and sustained tone signal normally indicating that the telephone is not in use and is operable, may be heard in the receiver of a normal telephone used in association with certain telephone systems and circuits. This same signal, normally of a selected principal frequency, is automatically or otherwise impressed therein or thereon by means not shown herein, and normally persists so long as the particular telephone associated with the particular circuit portion is not in use as for example, in closed circuit to and with another telephone. Therefore a caller, when using this type of telephone system and circuit, and upon hanging up his receiver or in another manner causing a severance of the closed telephone circuit including that of the callee, will, as a result of such action, cause the operation of components not shown, which operate to generate or produce audible sound waves and to impress such waves in the form of electrical impulses of a selected principal frequency range, in or upon the telephone circuit to and including the telephone of the callee. The description follows in detail of the means provided to cause the impulses to activate and cause to operate the aforesaid Phase Five automatic turn-off circuits, and others.

It has previously been described how the Phase One circuits are caused to be activated by the "intermittent" alternating current surges and how such surges are caused to cease and to be replaced with the "sustaining" current; how among other things, audible sound waves in the form of electrical impulses incoming from the telephone line, not shown, to which leads L1 and L2 are connected, are by circuit combination, conveyed, induced in or passed to the secondary winding of transformer X2 and are amplified by the Phase Three circuits and subsequently emitted as audible sound from loudspeaker SPKR by circuit combination. By reference to the drawing and to the Phase Five portion thereof in detail, it will be observed that to one terminal of secondary winding of transformer X2 there is connected the lead 10. The incoming audible sound waves in the form of current and voltage impulses are conveyed via lead 10, the restricting resistor V2, to the grid element of vacuum tube T5, and thence continuing via lead 102 to the center pole arm connection of switch S4, which is one of the three movable connecting arms of an ordinary 3-pole double-throw manually operable switch. With switch S4 placed in its B position, the lead 10 continues to contact B of switch S4, lead 57 to one terminal of the coil or inductance Q, and from the other terminal of coil Q to the common connecting ground of the apparatus. The lead 57 continues from the first mentioned terminal of the coil or inductance Q through the condenser C2 and therefrom to the last mentioned terminal of the said inductance Q. The condenser C2 is thus connected in shunt across or in parallel connection with the inductance Q. In circuit combination as described, the components mentioned are thus tuned to resonance with a narrow and limited band of current or voltage frequencies the primary frequency of which is arranged to be or fall within the normal audible range of frequencies by the preselection of the electrical characteristics and values of the mentioned components, connecting leads, and the common ground connection. This tuned circuit provides the means of screening or isolating from the remaining portions of the Phase Five circuits, any current or voltage impulse which does not fall within this narrow and limited band of frequencies and which is therefore not in resonance with the said tuned circuit. By so arranging the principal frequency and thus the basic resonance of the said tuned circuit to match or coincide with the principal frequency of the aforesaid sustained tone signal current or voltage impulse being conveyed by or appearing in the telephone circuit as above described, another current or voltage impulse having a frequency not included within the narrow and limited band referred to will not be passed to or effective upon the grid element of tube T5. Therefore, it obviously follows that only those current or voltage impulses falling within the said arranged narrow and limited frequency band and resonant with the said tuned circuit will be impressed in or up on the grid element of tube T5 and thence into or upon the other elements and components of the Phase Five circuits.

When the above referred to current or voltage impulses are impressed into or upon the grid element of tube T5 they are, by the designed function of that tube, amplified and thereafter emitted from the plate element thereof to lead 111 to which is connected the lead 12 and one terminal connection each of condensers C101 and C3. To the other terminal of condenser C3 is connected the lead 11, the grid element of tube T5A and one terminal of grid resistor V5. The other terminal of grid resistor V5 is connected to the common ground of the apparatus via the lead 14. The tube T5A is one-half of a twin triode with tube T5 being the other half.

The lead 12, connected to lead 111 as previously stated, has connected to its other end one terminal of the coil or inductance Z which in turn has connected to its other terminal the leads 20 and 104 with the former lead being connected to and carrying the high positive voltage supply to the plate element of tube T5, among others. In addition to its principal function as hereinafter described, and because of its designed electrical resistance, the coil or inductance Z offers a resistive path to the flow or passage of direct current to the plate element of tube T5 from the connecting source of such power, the lead 20. Because of this, coil Z performs the additional function of a normal plate voltage supply resistor, reducing and stabilizing the voltage as if such a resistor had actually been connected in series connection between the plate element of tube T5 and the positive voltage supply provided via the lead 20, in combination.

With reference now to the lead 104, it will be observed from the drawing that said lead is connected to and between the lead 20 and the connecting terminal of the manually operable center connecting arm of the switch S8. As illustrated, the switch S8 has its center connecting arm placed into electrical connection with one of its two fixed contact points, the contact F to which is connected the lead 105. The lead 104 is therefore brought into electrical connection with the lead 105, one terminal of condenser C101, and from the other terminal of that condenser to the lead 111, lead 12, to one terminal of coil Z. It will therefore be observed that the condenser C101 is thus placed in shunt or parallel electrical connection between one terminal of the coil Z and its other terminal via the leads 104, the movable connecting arm of switch S8, lead 105, condenser C101, lead 111 and lead 12.

By arrangement and selection of the electrical characteristics and values of the aforesaid components in combination described, the resultant configuration is a tuned circuit having a basic or principal frequency resonant with the basic or principal frequency of the previously described circuit tuned primarily by the coil Q and condenser C2, in combination. The means thus provided operate with effective control and further restriction upon the narrow and limited band of current or voltage impulse frequencies passable, as previously described, by the coil Q and tube T5, in combination. This effective control further restricts and limits the width of the aforementioned narrow and limited band of frequencies to a desired and arranged band width. The described tuned circuit thus provides the further means of screening or isolating from the remaining portions of the Phase Five circuits any current or voltage impulse of a frequency foreign to and which does not fall or come within the selected and arranged frequency band width. The reason for this will be apparent as the description proceeds.

With the aforesaid frequency band width of current or voltage impulses thus arranged to a desired and restricted configuration, said impulses are applied to and impressed in or upon the grid element of tube T5A via the means previously described. Again, by the designed function of the tube, the current or voltage impulses are amplified and thereafter emitted from the plate element of tube T5A to lead 15, condenser C4, lead 15, lead 17, the positive terminal of selenium rectifier SR, and from the negative terminal of that rectifier via lead 17, lead 14, to the common ground connection. The resistor V8 is placed in shunt or parallel connection across or with selenium rectifier SR and besides its stabilizing effect upon the operation thereof, serves additionally with resistor V9 as a normal grid resistor (grid-to-ground) for the grid element of tube T6 via leads 15, 17 and 14 to the common ground of the apparatus. By reference to the drawing it will be observed that likewise connected to lead 15 is one terminal of resistor V9, the other terminal of which is connected to the grid element of tube T6. From the control grid element of tube T6 extends lead 18 which has in series connection therewith the filter condenser C5 for the selenium rectifier SR, lead 14, and thence to the common ground connection. One terminal of the lead 107 is likewise connected to lead 18. As the frequency controlled alternating current impulses emitted from tube T5A, as above described, reach the rectifying circuit composed of selenium rectifier SR, resistor V8, resistor V9, filter condenser C5, and connecting leads, said impulses are rectified in part to direct current. The application of this positive direct current to or upon the control grid element of tube T6 causes by arrangement and design, an increase in the current flowing or emitted from the cathode element of tube T6 via lead 19, through the coil winding of relay R5, lead 14, to the common ground connection. The current flowing or emitted from the cathode element of tube T6 is further increased or augmented because of the connecting together of the plate and screen grid elements of that tube by the high positive voltage connecting lead 20, then the lead 22, and thence to the power and associated rectifying circuits previously described. The means provided, including the direct current input to the control grid of tube T6, creates larger variations in the current emitted from the cathode element of tube T6 in relation to a lesser input current to or upon the control grid thereof.

The relay R5 is arranged to respond to proper variations in current emitted from the cathode element of tube T6 as above described. As one result of this, any current impulse of a frequency passable and thereafter amplified by the aforesaid circuits and components thereof will, by circuit combination described, cause said relay R5 to become activated and to operate so as to close its normally open switch contacts B.

The closure of the contacts B of relay R5 completes a closed circuit which may be traced on the drawing as follows: one terminal of a secondary winding of power transformer X4, lead 1, normally closed contacts A of manually operable switch S2, lead 101, normally closed contacts A of thermo-element controlled relay R4, lead 4, center operable arm connection of switch S5 and via that arm to contact D of the switch S5, lead 7, closed contacts B of relay R5, lead 5 to and through the thermo-element of relay R4, lead 5, closed contact A of relay R3, lead 2, and return to the other terminal of the secondary winding of power transformer X4, above referred to. The relay R4 is of a type well known per se in the art and is adapted to operate after an arranged period of delay following the completion of an electrical circuit carrying current through its thermo-element and the action resultant from the heating of that element. Following the completion of the circuit to and through the thermo-element of relay R4 and the elapse of the arranged period of delay, the normally closed contacts A thereof are caused to operate and to become opened.

The opening of the normally closed contacts A of relay R4 interrupts or opens the circuit closed to and including the main power supply and the coil winding of relay R3, which, among other things, operates as a "holding" or circuit maintaining relay switch as previously described. The cessation of current to the coil winding of relay R3 because of the opening of the closed circuit thereto, causes the deenergization of that winding and the deactivation of that relay. With the deactivation of relay R3, its switch contacts A, B and C return to their normal positions, viz: contacts A return to an open position, contacts B return to a closed position and contacts C return to an open position. The return of contacts C to the open position in turn interrupts or opens the circuit closed to and between the telephone circuit, not shown, and the invention, and thus prevents the transmission of further current impulses to and between these respective things.

The deactivation of relay R3 as above described, causes the invention to return to the off or non-operating condition awaiting a subsequent activation.

The foregoing described the means provided whereby sound waves in the form of electrical impulses of an arranged principal frequency band width will cause the Phase Five circuits of the invention to first become activated and to operate said circuit components so as to effect an automatic turn-off or deactivation of the invention as a result of the said impulses.

The description which follows is a detailed presentation of the means provided to effect an automatic turn-off or deactivation of the invention as a result of the near or complete cessation of sound waves in the form of electrical impulses, sustained either within the invention or to and between the invention and the telephone circuit, not shown, to which the invention is connected by the leads L1 and L2.

As heretofore described, other telephone circuits to which the invention may be connected are arranged so that there is an absence of audible sound waves in the form of electrical impulses appearing or being in the said telephone circuit whenever that circuit, including the ordinary telephone instruments of caller and callee, is electrically altered, severed or made incomplete and open. To the end of enabling the invention to properly function under such an arrangement or condition, I have provided the following means whereby the invention will so function.

It has been described heretofore how the Phase One circuits are caused to be activated by the "intermittent" alternating current surges and how such surges are caused to cease and to be replaced with the "sustaining" current; how among other things, sound waves in the form of electrical current or voltage impulses incoming from the telephone line circuit, not shown, to which leads L1 and L2 are connected, are by circuit combination, conveyed to the secondary winding of transformer X2 and are amplified by the Phase Three circuits and subsequently emitted as audible sound waves from loudspeaker SPKR.

Now by examination of the drawing and the Phase Five portion thereof in detail, it will be observed that to one terminal of secondary winding of transformer X2 there is connected the lead 10. The incoming sound wave current or voltage impulses are induced into the said secondary winding of the transformer as previously described and are conveyed via lead 10 to stationary contact A of switch S4, the said switch S4 being an integral part of of the previously described 3-pole double-throw switch. With the adjustable and connecting arm of switch S4 placed into its A contact position, the lead 10 continues via that arm to lead 102 connected therewith, and via that lead to the grid element of tube T5. It will be observed therefore that the lead 102, the movable arm of switch S4 placed in connection with its A contact and the lead 10, as arranged, place an effective short circuit or shunt connection across the restricting resistor V2. Such an arrangement shorts out and electrically removes the resistor V2 from that circuit.

With the adjustment of the switch S4 to its A contact position, its B contact, lead 57, coil Q and condenser C2 are thus electrically isolated and removed from connection with the remaining portions of the Phase Five circuits.

Electrically removing the restricting resistor V2, coil Q, condenser C2 in combination described, from the remaining portions of the Phase Five circuits likewise effectively removes therefrom the frequency limiting and tuning capabilities of those components. This arrangement permits the grid element of tube T5 to receive, have impressed therein or thereon, and to respond to any and all current and voltage frequencies conveyed thereto by the lead 10 from the secondary winding of transformer X2. By selection and arrangement, the resistive or resistance value of the secondary winding of transformer X2 with its opposite terminal grounded to the common ground, acts as, for and in place of a normal grid element resistor.

When the above referred to current and voltage impulses of multitude frequencies are impressed into or upon the grid element of tube T5 they are, by the designed function of that tube, amplified and thereafter emitted from the plate element thereof to lead 111 to which, among other things, is connected the lead 12. The lead 111 is likewise connected to one terminal of condenser C3 which has connected to its other terminal the lead 11, grid element of tube T5A and one terminal of grid resistor V5. The other terminal of grid resistor V5 is connected to the lead 14 and thus to the common ground of the apparatus.

With the manual placement of the switch S4 to position in contact with its A contact, the connecting arm of the switch S8 and the connecting arm of the switch S5, being integral parts of the aforesaid 3-pole double-throw switch, are removed from their contacts F and D and placed into electrical connection with their E and C contacts respectively. The movement of the switch S8 arm to its E contact opens the circuit to and electrically removes the condenser C101 from the circuit as an effective component thereof and at the same time makes additive and effective a capacitance from the cathode element of tube T5 to the common ground of the apparatus. The latter circuit may be traced on the drawing as follows: the cathode element of tube T5, lead 103, condenser C100, lead 103, contact E of switch S8, the movable connecting arm of switch S8, the connecting terminal of that movable arm, lead 104, lead 20, lead 22, lead 52, condenser C13, lead 53 to the common ground of the apparatus. It is well known per se in the art that by the design and arrangement of certain vacuum tubes, a circuit combination consisting in part of a cathode resistor-to-ground, bypassed by proper capacitance, will increase the amplification factor of such tubes. The current and voltage impulses of multitude frequencies and amplified or increased as described, will thereupon be impressed into or upon the grid element of tube T5A via the means described, and will again, by its designed function be amplified and thereafter emitted by or from the plate element of the tube T5A. The now greatly amplified impulses emitted from the plate element of tube T5A continue via lead 15, condenser C4, lead 15, lead 17, the positive terminal of selenium rectifier SR, and from the negative terminal of that rectifier via lead 17, lead 14 to the common ground connection. The resistor V8 is placed in shunt or parallel connection across or with selenium rectifier SR to serve additionally as one of the two grid element resistors for the grid element of tube T6 as previously described. For the immediate foregoing description and purpose however, the resistor V8 is provided to effect upon the selenium rectifier SR, in combination, further stabilization of performance and thus more efficient rectification of the aforesaid current or voltage impulses. Now likewise connected to lead 15 is one terminal of resistor V9, the other terminal of which is connected to the grid element of tube T6. From the grid element of tube T6 also extends lead 18 which has in series connection therewith the filter condenser C5, lead 14, and thence to the common ground connection. The lead 107 is likewise connected to lead 18. As the alternating current and voltage impulses emitted from tube T5A as above described, reach the rectifying circuit composed of selenium rectifier SR and other components in combination described, said impulses are rectified in part to a direct current. The approximate coincident application of this positive direct current or voltage to or upon the control grid element of tube T6 as shown, causes by design, an increase in the current flowing from the cathode element of tube T6, lead 19, through the coil winding of relay R5, lead 14, to the common ground connection. The current flowing from the cathode element of tube T6 is further increased or augmented because of the connecting together of the plate and screen grid elements of that tube by the high positive voltage connecting lead 20, the lead 22, and thence to the main power supply and rectifying circuits of the apparatus, previously described. The means provided, including the positive direct current input to the control grid element of tube T6, creates larger variations in the current emitted from the cathode element of that tube in relation to any lesser input current to or upon the control grid element thereof.

The relay R5 is arranged to respond to proper variations in the current emitted from the cathode element of tube T6 as previously described. As a result of this, current or voltage of any frequency passable by or falling within the operable limitation of the circuit, in combination, will cause said relay R5 to become energized and activated and to open its normally closed switch contacts A and to close its normally open switch contacts B and C.

As described, any current or voltage impulse having a frequency within the normal audible range and passable by, in or upon the Phase Five circuits and components thereof, will in turn be effective with and upon tube T6 and the relay R5, in combination. Again, because audible sound waves vary in intensity in between an absolute minimum and an absolute maximum, any current or voltage impulse resultant and produced therefrom by electrical means provided, will vary in a proportional ratio, dependent upon such provided means. Since neither an absolute minimum nor an absolute maximum sound wave exchange will occur during normal use or operation of the invention, neither will there be an absolute minimum nor maximum development and flowing of current or voltage impulses. Such impulses as are developed however will result in a respondent variation in the magnitude of the current flowing to and upon the grid element of tube T6 and from the cathode element of that tube to and through the coil winding of relay R5 to the common ground connection, in combination. The absence of any such impulse results in a reduction of the said current and the presence of such an impulse results in an increase in the said current.

To accomplish the designed objective heretofore set forth, the instant means provided is therefore arranged to be respondent to the cessation or near cessation of current or voltage impulse frequencies within the audible range, when such cessation or near cessation is sustained within the apparatus for a selected and arranged period of time. The means provided has been arranged so as not to be immediately responsive to a momentary cessation of such impulses resultant from a temporary absence of sound, as for example, during a short lapse in a conversation between caller and callee when using the apparatus in the normal and arranged manner. The apparaus has been arranged however to be immediately responsive to the cessation or near cessation of such impulses following the elapse of the aforesaid selected and arranged period of time.

As has been previously described, with the invention positioned in the non-operative condition and awaiting a subsequent activation, the relay R3 is deenergized and the switch contacts C thereof are in the normal open position, thus causing an open circuit condition to exist between the telephone circuit, not shown, to which is connected the invention. This is so, because lead L1 connected to said telephone circuit terminates at one side of the then open switch contacts C of relay R3. And since there does then exist an open circuit condition to and between said telephone circuit and the invention, sound wave current and voltage impulses from said telephone line or circuit or from the Phase Four circuits disclosed cannot then reach the Phase Five circuits to cause said Phase Five circuits, in combination described, to operate or function in the described and arranged manner. Therefore, during the non-operative standby condition of the invention and the absence in the circuits described of sound wave current or voltage impulses falling or coming within the audible frequency range, no such impulse will be impressed in or upon the grid element of tube T5A, amplified by tube T5A, rectified by the rectifying circuit including selenium rectifier SR, impressed in or upon the grid element of tube T6, and emitted via the cathode element thereof to effect and cause the relay R5 to become energized and operate. The relay R5 will then be in its normal inoperative condition with its switch contacts A closed and switch contacts B and C open. However, with the next activation and operation of the relay R3 and the completion of a closed circuit to and between the said telephone circuit and the invention, and the resultant movement of switch contacts A, B, and C of relay R3 as previously described, any sound wave current or voltage impulse falling or coming within the audible frequency range will pass between the said telephone and/or the invention and be effective with and upon the relay R5 and cause said relay to thereupon operate and function as previously disclosed herein.

With the operation of the relay R5, resulting in part by the prior operation of the relay R3, the switch contacts A of relay R5 are caused to open and the switch contacts B and C are caused to close. This is so because any aforesaid impulse from the above referenced telephone or Phase Four circuits will approximately forthwith be present in the described circuits, including the Phase Five portion thereof. This will result in an increase in the current flowing from the cathode element of tube T6 through the coil winding of relay R5 as previously described, and will thereupon energize and activate relay R5 and so operate its switch contacts. The approximate simultaneous energization and activation of relay R3 and relay R5, with the resultant opening of the switch contacts A and closing of contacts B and C of relay R5, maintains and holds effective an open circuit condition to and including the thermo-element of relay R4, in combination.

Such a circuit, above described, is maintained open for an arranged period of time by the preselection of electrical characteristics and values of the used components, in combination described, including the relay R5, relay R4, and condenser C106. While such a circuit is maintained open to and including the relay R4 the apparatus, for reasons described, will continue to be held energized and operative in a normal condition. Such a condition will persist so long as such a current or voltage impulse is present or the results of such a presence is maintained in the Phase Five circuits described.

I have provided the relay R4, condenser C106, among other things in combination, to effect the said arranged period of time and to prevent the intermittent deenergization and deactivation of relay R5 following its response to each aforesaid individual impulse. The means so provided is arranged to hold relay R5 energized and operated as a result of each such impulse for a portion of the said total arranged period of time, while the relay R4 is provided to accomplish the remaining delay desired to complete the remaining portion of the said total arranged period of time. This means is now described in detail: by reference to the foregoing and to the drawing it will be observed that one terminal of the lead 107 is connected to the lead 18 which in turn is connected to the control grid element of tube T6, resistor V9 and filter condenser C5, while the other terminal of lead 107 is connected with and terminates at the otherwise electrically isolated open side of normally open contacts C of relay R5. It will likewise be observed that the other side of said contacts C is connected with one side of condenser C106 and that the other side of that condenser is connected to the common ground of the apparatus. The capacitance of the said condenser C106 is therefore additive to that of condenser C5 to and between the control grid element of tube T6 and the common ground at all times during the energization and operation of relay R5 and the resultant closure of its contact points C. Such a circuit may be traced on the drawing by beginning at the control grid element of tube T6, lead 18, condenser C5, lead 14 to the common ground, and, control grid element of tube T6, lead 18, lead 107, closed contacts C of relay R5, condenser C106 to the common ground referred to.

Now the capabilities of a condenser are well known per se in the art. Among these is the ability to receive, retain and discharge an electrostatic charge impressed therein or thereon. It is likewise well known that the said discharge may be arranged to take place instantly or gradually. By the instant means provided, I have arranged therefore to so use the positive direct current emanating from selenium rectifier SR, in combination, and conveyed therefrom to the control grid element of tube T6 as heretofore described, and, via lead 18, lead 107, the then closed contacts C of relay R5, condenser C106 to the common ground. The closure of the said contacts C permits condenser C106, because of its selected value and additive capacitance, to thus become charged by the said positive direct potential and to receive and temporarily retain the said charge. Connection of condenser C106 with the control grid element of tube T6 as described, is arranged to permit a gradual discharge, for a selected period of time, of the said accumulated positive charge to and upon the said control grid element. The purpose of this is to thus maintain for that selected period of time a continuing supply of positive potential to and effective upon the said control grid element in order that said tube T6, for a like period of time, may emit from its cathode element a required amount of current to maintain energized and operated the relay R5 connected therewith, in combination.

Now as heretofore described, any impulse to or between the invention and the telephone circuit, not shown, to which the apparatus is connected, will approximately forthwith be effective upon and cause the relay R5 to become energized and to operate and close its normally open contacts C. Such closure will result in the said relay being maintained in an operative condition for the arranged period as described, and will thus prevent its intermittent deenergization and return to an inoperative condition during that arranged period of time.

Following the expiration of the aforesaid portion of the total arranged period, the current output from the cathode element of tube T6 becomes less than the amount for which the relay R5 is arranged to be responsive to. The coil winding of that relay will therefore become deenergized and the contacts A thereof will again become closed and the contacts B and C will again become open. The closure again of the switch contacts A of relay R5 completes a closed circuit to and including the thermo-element of relay R4. Such a circuit is now effectively provided upon the cessation or near cessation of current or voltage impulse frequencies within the audible range sustained in and to the Phase Five circuits, in combination, and a resultant reduction in the current flowing from the cathode element of tube T6 through the coil winding of relay R5 to the common ground connection. These things are arranged to occur because of the sustained absence of such current impulses in the circuits described. The description of the effective means so provided for this follows: one terminal of secondary winding of power transformer X4, lead 1, normally closed switch contacts A of manually operable switch S2, lead 101, normally closed switch contacts A of thermo-element controlled relay R4, lead 4 to the center pole connecting arm of switch S5, via that connecting arm to contact C of switch S5, lead 8 to one side of closed switch contacts A of relay R5 (the switch contacts A are then being maintained in a closed condition because of the sustained absence of current or voltage impulses within the audible range in the Phase Five circuits as heretofore described), lead 5, one side of thermo-element of relay R4, the other side of that thermo-element to lead 5, closed switch contacts A of relay R3, lead 2, the other terminal of the said secondary winding of power transformer X4 to thus complete and close the circuit.

The closed circuit above described, will thus be maintained closed during the sustained absence of the aforesaid current or voltage impulses in the Phase Five circuits described. After the expiration of the aforesaid preselected and arranged total period of time and resultant action effecting the thermo-element of relay R4, the relay R4 will be caused to operate and to open its normally closed contacts A. As heretofore set forth, the opening of the contacts A, relay R4, in combination described, opens the circuit to and including the "holding" relay R3 because of the interruption of current thereto and the opening of the switch contacts A thereof, thus causing the invention to return to the off or in-operative condition and awaiting a subsequent activation.

In connection with the foregoing, it is appropriate to repeat that the occasional, if any, closing of the switch contacts A of relay R5, because of variation in current applied to the coil winding of that relay as previously described, does not result in the immediate operation of the normally closed contacts A of the thermo-element controlled relay R4. This is so because, as previously pointed out, the relay R4 is of a type well known per se in the art which is adapted to become operative and to function only following the elapse of a preselected and arranged period of time after the completion of a circuit carrying current to and including its thermo-element. Since any intermittent closing of the contacts A of relay R5 will not provide such a sustained closed circuit to and including the said thermo-element, that relay is therefore not forthwith caused to become activated and to operate.

Now with further consideration of the foregoing and with particular reference to the Phase One circuits provided, it is to be understood of course that relays R1 and R3 thereof may likewise be arranged to be respondent to direct current rather than to alternating current. For example, the relay R1 as illustrated is respondent to the "intermittent" alternating ringing current surges as previously described. In order, under certain conditions, to utilize inherent characteristics of a relay having a coil winding responsive only to a direct current supply, a common selenium or other type rectifying medium may be used as, for example, by connection thereof to the lead 59 and to lead 60 in order to rectify the said incoming alternating intermittent current impulses to a required direct current. Also, in the case of the relay R3 whether with or without the relay R1 being similarly arranged, it likewise may be desirable under certain conditions to utilize inherent characteristics of a relay having a coil winding responsive only to a direct current supply. Under such a condition the coil winding of relay R3 may, for example, be arranged to be responsive only to a direct current supply by the simple expedient, to name one such example, of connecting a common selenium or other type rectifying medium in shunt or short circuit connection across and between the said coil winding terminals of the said relay from the lead 4 to the lead 5. Such an arrangement will thereafter, so long as existent, rectify to a direct current any alternating current voltage applied to the said coil winding via leads previously described.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a sound amplifying system for telephone circuits, the combination, with a source of electric power and with a telephone circuit including a telephone instrument and its signal, of a first electrically actuated switch; means conductively coupled with said signal responding to the impression of intermittent, ringing current on the signal to energize said switch; a second electrically actuated switch energized responsive to energizing of the first switch and connected to said source so as to remain energized without regard to deenergizing of the first switch; means actuated by energizing of the second switch for terminating the intermittent ringing current and stabilizing a sustained "talk" current in the telephone circuit; a sound transmission circuit including a microphone; a sound-receiving circuit including a loudspeaker; a connecting circuit inductively coupled with each of said transmission and receiving circuits and coupled conductively with the telephone circuit, said connecting circuit being closed by energizing of the second switch for carrying sound waves between the called telephone and said receiving and transmitting circuits respectively; a turn-off circuit; a screening circuit tuned to a given resonance such as that produced by the tone signal of a telephone circuit, and coupling the turn-off circuit to the transmitting and receiving circuits, said screening circuit being adapted to isolate from the turn-off circuit sound waves not in the frequency to which the screening circuit is tuned, said turn-off circuit including a third electrically actuated switch and also including means to energize said third switch whenever waves of said frequency are impressed upon the turn-off circuit, such as by return of a tone signal to said telephone circuit; and means actuated by said third switch for deenergizing the second switch to thereby break the connection between the connecting circuit and telephone circuit and return the system to a standby condition.

2. An apparatus for amplifying the sound produced in a telephone circuit by a calling party, and for transmitting to the calling party sounds occurring within a predetermined acoustical range surrounding the apparatus, comprising: a sound-receiving circuit including a speaker for distributing, throughout the acoustical range thereof, the sounds made by a calling party; a sound-transmitting circuit including a microphone, for pick-up of sounds occurring within the acoustical range of the microphone and to be transmitted to the calling party; means for connecting each of the receiving and transmitting circuits to the telephone circuit; an electrically actuated turn-off switch; means actuated responsive to energizing of the switch for severing the connection between the telephone circuit and the receiving and transmitting circuits; and means for energizing said switch under each of the following conditions, namely, the existence of a tone-signal-producing current in said telephone circuit, and the sustained absence of any such current in said telephone circuit.

3. An apparatus for amplifying the sound produced in a telephone circuit by a calling party, and for transmitting to the calling party sounds occurring within a predetermined acoustical range surrounding the apparatus, comprising: a sound-receiving circuit including a speaker for distributing, throughout the acoustical range thereof, the sounds made by a calling party; a sound-transmitting circuit including a microphone, for pick-up of sounds occurring within the acoustical range of the mircophone and to be transmitted to the calling party; means for connecting each of the receiving and transmitting circuits to the telephone circuit; an electrically actuated turn-off switch; means actuated responsive to energizing of the switch for severing the connection between the telephone circuit and the receiving and transmitting circuits; and means for energizing said switch under each of the following conditions, namely, the existence of a tone-signal-producing current in said telephone circuit, and the sustained absence of any such current in said telephone circuit, comprising a turn-off circuit and a screening circuit coupling the turn-off circuit to the transmitting and receiving circuits, said turn-off circuit including the turn-off switch and being adapted to impress upon the switch current effective to energize the same first, whenever sound waves of the tone signal frequency are impressed on the turn-off circuit and second, when there is a sustained absence of tone signal current in the telephone circuit, said screening circuit being adapted to screen from the turn-off circuit any sound waves not of said frequency.

4. In a sound receiving and transmitting apparatus to be substituted for a telephone instrument at the called end of a telephone circuit, a sound-receiving circuit including a speaker; a sound transmission circuit including a microphone; circuits coupling the receiving and transmitting circuits, respectively, to said telephone circuit; a set of contacts common to both of the connecting circuits; an electrically actuated holding switch maintaining said contacts closed when energized; an electrically actuated turn-off switch; means operative to deenergize the holding switch responsive to energizing of the turn-off switch to open the contacts and thereby open the circuits connecting the telephone circuit to the receiving and transmitting circuits respectively; and means responding to each of the following conditions, namely the existence of a tone signal in a telephone circuit and the sustained absence of tone signal current in said circuit, to energize the turn-off switch.

5. An apparatus for amplifying the sound produced in a telephone circuit by a calling party, and for transmitting to the calling party sounds occurring within a predetermined acoustical range surrounding the apparatus, comprising: a sound-receiving circuit including a speaker for distributing, throughout the acoustical range thereof, the sounds made by a calling part; a sound-transmitting circuit including a microphone, for pick-up of sounds occurring within the acoustical range of the microphone and to be transmitted to the calling party; means for connecting each of the receiving and transmitting circuits to the telephone circuit; a set of contacts in said connecting means; an electrically actuated holding switch adapted when energized to maintain said contacts closed; a source of electric power in circuit with the holding switch; second, normally closed contacts in circuit with the holding switch; a thermo-element-controlled switch adapted when energized to open the second contacts; contact means in circuit with the last-named switch; an electrically actuated turn-off switch arranged to actuate said contact means to energize the thermo-element-controlled switch; and a turn-off circuit arranged to detect first, the existence of a tone signal in the telephone circuit, and second, the sustained absence of any tone signal current in the telephone circuit and arranged to energize the turn-off switch under each of these conditions.

6. In a sound receiving and transmitting apparatus to be substituted for a telephone instrument at the called end of a telephone circuit, a sound-receiving circuit including a speaker; a sound transmission circuit including a mircophone; circuits coupling the receiving and transmitting circuits, respectively, to said telephone circuit; a set of contacts common to both of the connecting circuits; an electrically actuated holding switch maintaining said contacts closed when energized; an electrically actuated turn-off switch; means operative to deenergize the holding switch responsive to energizing of the turn-off switch to open the contacts and thereby open the circuits connecting the telephone circuit to the receiving and transmitting circuits respectively; means responding to each of the following conditions, namely the existence of a tone signal in a telephone circuit and the sustained absence of current in said circuit, to energize the turn-off switch; and manually operable, two-position switch means limiting response of the turn-off-switch-operating means, in one of its two positions, to the existence of a tone-signal-producing current in the telephone circuit, and in its other position limiting said response to the sustained absence of tone signal current in the telephone circuit.

7. In a sound receiving and transmitting apparatus to be substituted for a telephone instrument at the called end of a telephone circuit, a sound-receiving circuit including a speaker; a sound transmission circuit including a mircophone; circuits coupling the receiving and transmitting circuits, respectively, to said telephone circuit; a set of contacts common to both of the connecting circuits; an electrically actuated holding switch maintaining said contacts closed when energized; an electrically actuated turn-off switch; means operative to deenergize the holding switch responsive to energizing of the turn-off switch to open the contacts and thereby open the circuits connecting the telephone circuit to the receiving and transmitting circuits respectively; and means responding to each of the following conditions, namely the existence of a tone signal in a telephone circuit and the sustained absence of tone signal current in said circuit, to energize the turn-off switch, comprising screening and turn-off circuits connected to the sound-receiving circuit, said screening circuit being tuned to screen from the turn-off circuit sound impulses not of a frequency resonant with the screening circuit, and being tuned to the frequency of sound impulses created by a dial tone in the sound-receiving circuit, the turn-off circuit including an electronic tube having an element arranged to emit variations in current of a value such as to energize the turn-off switch, responsive to the impression of impulses of the value of said frequency on the control grid of said tube, and responsive also to the existence at the control grid of any input of a lesser value.

8. In a sound amplifying system for telephone circuits, the combination, with a source of electric power and with a telephone circuit including a telephone instrument and its signal, of a first electrically actuated switch; means conductively coupled with said signal responding to the impression of intermittent, ringing current on the signal to energize said switch; a second, thermo-element-controlled switch energized following a predetermined lapse of time responsive to energizing of the first switch and connected to said source so as to remain energized without regard to deenergizing of the first switch; means actuated by energizing of the second switch for terminating the intermittent ringing current and stabilizing a sustained, "talk" current in the telephone circuit; a sound transmission circuit including a microphone; a sound-receiving circuit including a loudspeaker; a connecting circuit inductively coupled with each of said transmission and receiving circuits and coupled conductively with the telephone circuit, said connecting circuit being closed by energizing of the second switch for carrying sound waves between the called telephone and said receiving and transmitting circuits respectively; a turn-off circuit; a screening circuit tuned to a given resonance such as that produced by the tone signal of a telephone circuit, and coupling the turn-off circuit to the transmitting and receiving circuits, said screening circuit being adapted to isolate from the turn-off circuit sound waves not in the frequency to which the screening circuit is tuned, said turn-off circuit including a third electrically actuated switch and also including means to energize said third switch whenever waves of said frequency are impressed upon the turn-off circuit, such as by the return of a tone signal to said telephone circuit; and means actuated by said third switch for deenergizing the second switch to thereby break the connection between the connecting circuit and telephone circuit and return the system to a stand-by condition.

9. An apparatus for amplifying the sound produced in a telephone circuit by a calling party, and for transmitting to the calling party sounds occurring within a predetermined acoustical range surrounding the apparatus, comprising: a sound-receiving circuit including a speaker for distributing, throughout the acoustical range thereof, the sounds made by a calling party; a sound-transmitting circuit including a microphone, for pick-up of sounds occurring within the acoustical range of the microphone and to be transmitted to the calling party; means for connecting each of the receiving and transmitting circuits to the telephone circuit; an electrically actuated turn-off switch; means actuated responsive to energizing of the switch for severing the connection between the telephone circuit and the receiving and transmitting circuits; means for energizing said switch under each of the following conditions, namely, the existence of a tone-signal-producing current in said telephone circuit, and the sustained absence of any tone signal current in said telephone circuit, the sound-transmitting circuit including resistor means for controlling voltages impressed by the sound-transmitting circuit on the telephone circuit; and manually operable, two-position switch means arranged when in one position to place a short circuit over part at least of said resistor means to reduce said voltage.

10. An apparatus for amplifying the sound produced in a telephone circuit by a calling party, and for transmitting to the calling party sounds occurring within a predetermined acoustical range surrounding the apparatus, comprising: a sound-receiving circuit including a speaker for distributing, throughout the acoustical range thereof, the sounds made by a calling party; a sound-transmitting circuit including a microphone, for pick-up of sounds occurring within the acoustical range of the microphone and to be transmitted to the calling party; means for connecting each of the receiving and transmitting circuits to the telephone circuit; an electrically actuated turn-off switch; means actuated responsive to energizing of the switch for severing the connection between the telephone circuit and the receiving and transmitting circuits; means for energizing said switch under each of the following conditions, namely, the existence of a tone-signal-producing current in said telephone circuit, the sound-transmitting circuit including resistor means for controlling voltages impressed by the sound-transmitting circuit on the telephone circuit; and manually operable, two-position switch means arranged when in one position to place a short circuit over part at least of said resistor means to reduce said voltage, said switch means being so connected between the sound-receiving and sound-transmitting circuits, as to, in the second position of the switch means, remove the speaker from the sound-receiving circuit while effecting an increase in voltage in the sound-transmitting circuit with a corresponding increase in the sensitivity of said microphone.

11. An apparatus for amplifying the sound produced in a telephone circuit by a calling party, and for transmitting to the calling party sounds occurring within a predetermined acoustical range surrounding the apparatus, comprising: a sound-receiving circuit including a speaker for distributing, throughout the acoustical range thereof, the sounds made by a calling party; a sound-transmitting circuit including a microphone, for pick-up of sounds occurring within the acoustical range of the microphone and to be transmitted to the calling party; means for connecting each of the receiving and transmitting circuits to the telephone circuit, comprising a segregating and balancing network including a pair of transformers respectively coupling the telephone circuit inductively to the receiving and transmitting circuits, and condenser and resistor means arranged to provide shunt connection paths across each of said transformers during the impression of sound waves on the other transformer; an electrically actuated turn-off switch; means actuated responsive to energizing of the switch for severing the connection between the telephone circuit and the receiving and transmitting circuits; and means for energizing said switch under each of the following conditions, namely, the existence of a tone-signal-producing current in said telephone circuit, and the sustained absence of any tone signal current in said telephone circuit.

12. An apparatus for amplifying the sound produced in a telephone circuit by a calling party, and for transmitting to the calling party sounds occurring within a predetermined acoustical range surrounding the apparatus, comprising: a sound-receiving circuit including a speaker for distributing, throughout the acoustical range thereof, the sounds made by a calling party; a sound-transmitting circuit including a microphone, for pick-up of sounds occurring within the acoustical range of the microphone and to be transmitted to the calling party; means for connecting each of the receiving and transmitting circuits to the telephone circuit, comprising a segregating and balancing network including a pair of transformers respectively coupling the telephone circuit inductively to the receiving and transmitting circuits, and condenser and resistor means arranged to provide shunt connection paths across each of said transformers during the impression of sound waves on the other transformer, said condenser and resistor means including a first variable resistor in the shunt connection path across the transformer of the receiving circuit, and a second variable resistor in the shunt connection path across the transformer of the transmitting circuit; an electrically actuated turn-off switch; means actuated responsive to energizing of the switch for severing the connection between the telephone circuit and the receiving and transmitting circuits; and means for energizing said switch under each of the following conditions, namely, the existence of a tone-signal-producing current in said telephone circuit, and the sustained absence of any tone signal current in said telephone circuit.

13. An apparatus for amplifying the sound produced in a telephone circuit by a calling party, and for transmitting to the calling party sounds occurring within a predetermined acoustical range surrounding the apparatus, comprising: a sound-receiving circuit including a speaker for distributing, throughout the acoustical range thereof, the sounds made by a calling party; a sound-transmitting circuit including a microphone, for pick-up of sounds occurring within the acoustical range of the microphone and to be transmitted to the calling party; means for connecting each of the receiving and transmitting circuits to the telephone circuit, comprising a segregating and balancing network including a pair of transformers respectively coupling the telephone circuit inductively to the receiving and transmitting circuits, and condenser and resistor means arranged to provide shunt connection paths across each of said transformers during the impression of sound waves on the other transformer, said condenser and resistor means including a first variable resistor in the shunt connection path across the transformer of the receiving circuit, and a second variable resistor in the shunt connection path across the transformer of the transmitting circuit, the condenser and resistor means further including a single condenser connected between the second resistor and the transmitting circuit transformer; an electrically actuated turn-off switch; means actuated responsive to energizing of the switch for severing the connection between the telephone circuit and the receiving and transmitting circuits; and means for energizing said switch under each of the following conditions, namely, the existence of a tone-signal-producing current in said telephone circuit, and the sustained absence of any tone signal current in said telephone circuit.

14. An apparatus for amplifying the sound produced in a telephone circuit by a calling party, and for transmitting to the calling party sounds occurring within a predetermined acoustical range surrounding the apparatus, comprising: a sound-receiving circuit including a speaker for distributing, throughout the acoustical range thereof, the sounds made by a calling party; a sound-transmitting circuit including a microphone, for pick-up of sounds occurring within the acoustical range of the microphone and to be transmitted to the calling party; means for connecting each of the receiving and transmitting circuits to the telephone circuit, comprising a segregating and balancing network including a pair of transformers respectively coupling the telephone circuit inductively to the receiving and transmitting circuits, and condenser and resistor means arranged to provide shunt connection paths across each of said transformers during the impression of current carrying sound waves on the other transformer, said condenser and resistor means including a first variable resistor in the shunt connection path across the transformer of the receiving circuit, and a second variable resistor in the shunt connection path across the transformer of the transmitting circuit, the condenser and resistor means further including a single condenser connected between the second resistor and the transmitting circuit transformer, and a condenser in shunt across the path of current flow between the receiving circuit transformer and telephone circuit to aid in filtering and balancing of impulses transmitted in said path; an electrically actuated turn-off switch; means actuated responsive to energizing of the switch for severing the connection between the telephone circuit and the receiving and transmitting circuits; and means for energizing said switch under each of the following conditions, namely, the existence of a tone-signal-producing current in said telephone circuit, and the sustained absence of any tone signal current in said telephone circuit.

15. In a sound amplifying system for telephone circuits, the combination, with a source of electric power and with a telephone circuit including a telephone instrument and its signal, of a first electrically actuated switch; means conductively coupled with said signal responding to the impression of intermittent, ringing current on the signal to energize said switch; a second electrically actuated switch of the delayed action type energized responsive to energizing of the first switch and connected to said source so as to remain energized without regard to deenergizing of the first switch; means actuated by energizing of the second switch for terminating the intermittent ringing current and stabilizing a sustained "talk" current in the telephone circuit; a sound transmission circuit including a microphone; a sound-receiving circuit including a loudspeaker; a connecting circuit inductively coupled with each of said transmission and receiving circuits and coupled conductively with the telephone circuit, said connecting circuit being closed by energizing of the second switch for carrying sound waves between the called telephone and said receiving and transmitting circuits respectively; a turn-off circuit; a screening circuit tuned to a given resonance such as that produced by the dial tone of a telephone circuit, and coupling the turn-off circuit to the transmitting and receiving circuits, said screening circuit being adapted to isolate from the turn-off circuit sound waves not in the frequency to which the screening circuit is tuned, said turn-off circuit including a third electrically actuated switch and also including means to energize said third switch whenever waves of said frequency are impressed upon the turn-off circuit, such as by return of a dial tone to said telephone circuit; and means actuated by said third switch for deenergizing the second switch to thereby break the connection between the connecting circuit and telephone circuit and return the system to a stand-by condition.

References Cited in the file of this patent

UNITED STATES PATENTS

| | | |
|---|---|---|
| 2,539,565 | Beatty | Jan. 30, 1951 |
| 2,552,788 | Hoover | May 15, 1951 |